H. OWEN.
TIRE.
APPLICATION FILED MAR. 22, 1919.

1,398,200.

Patented Nov. 22, 1921.
2 SHEETS—SHEET 1.

WITNESSES:
R. A. Thomas

INVENTOR
Harry Owen
BY
Victor J. Evans
ATTORNEY

H. OWEN.
TIRE.
APPLICATION FILED MAR. 22, 1919.

1,398,200.

Patented Nov. 22, 1921.
2 SHEETS—SHEET 2.

WITNESSES:
R. A. Thomas.

INVENTOR
Harry Owen
BY
Victor J. Evans
ATTORNEY

UNITED STATES PATENT OFFICE.

HARRY OWEN, OF ROOSEVELT, UTAH.

TIRE.

1,398,200.   Specification of Letters Patent.   Patented Nov. 22, 1921.

Application filed March 22, 1919. Serial No. 284,257.

*To all whom it may concern:*

Be it known that I, HARRY OWEN, a citizen of the United States, residing at Roosevelt, in the county of Duchesne and State of Utah, have invented new and useful Improvements in Tires, of which the following is a specification.

The object of the present invention is to provide a novel construction of tire of the pneumatic type, in which the inner tube is replaced by a plurality of separate air cells, so that should one cell become punctured the loss of air therefrom will not interfere with the proper work of the tire.

Another object is the provision of a tire of this character in which the air cells are placed in the tire casing while the said cells are inflated, a sufficient number being positioned therein to properly expand the casing so that loss of air from one or more cells will not materially affect the resiliency of the tire.

A further object is to provide separate cells of spherical form whose diameter is substantially the same as the cross section diameter of the inside of the casing, so that when the said cells are crowded within the casing, the latter will be expanded in a manner to distribute the greatest strain around the circumference of the tire or against the tread, the latter being thickened and better able to resist pressure.

A further object is the provision of resilient separators which are placed between the air cells and provide a filling for the space formed at the point of separation of the cells at the inner and outer diameter of the tire.

Other objects and advantages of the invention will appear as the following description is read in connection wth the accompanying drawings.

Figure 1:
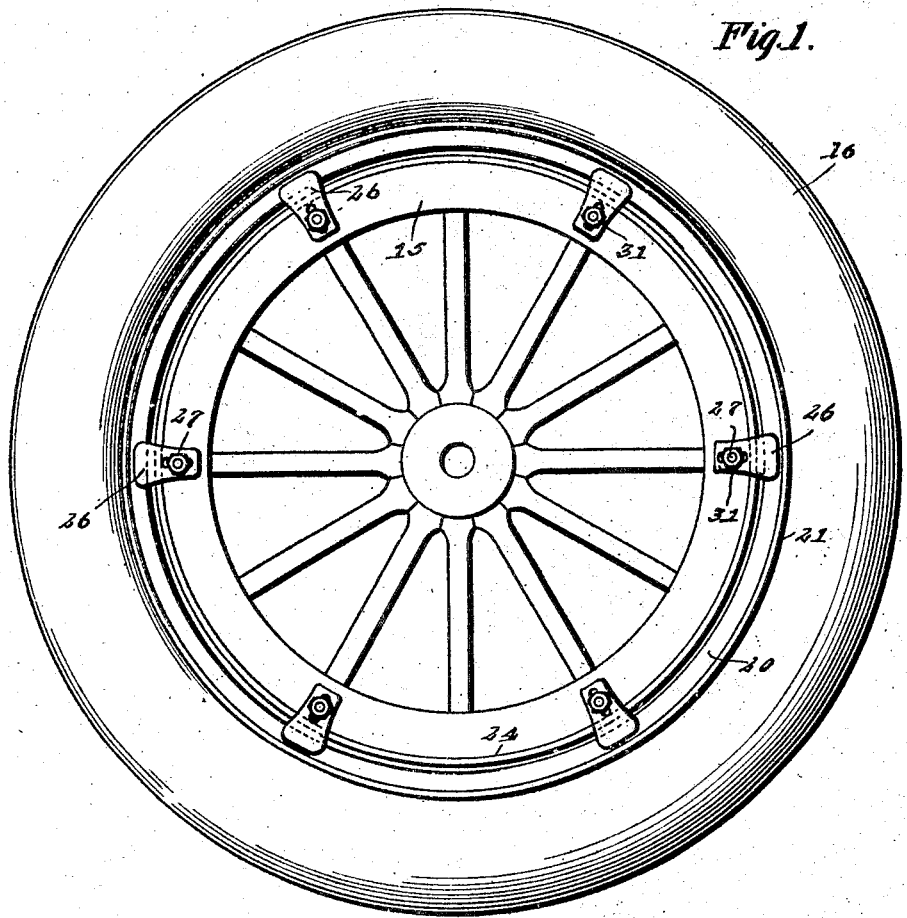
Figure 1 is a side elevation of a vehicle wheel equipped with an improved rim and tire, the tire or casing being of the "straight side" type.
Figure 5:
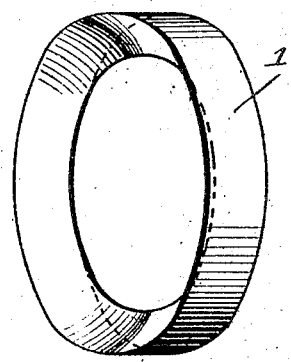
Fig. 5 is a detailed perspective view of one of the flexible separators.
Figure 4:
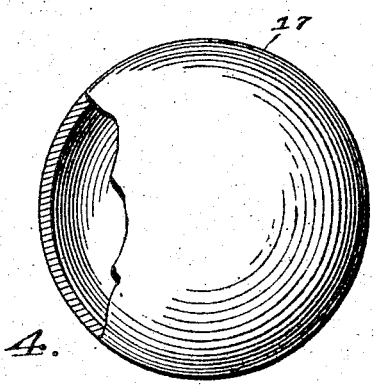
Fig. 4 is an elevation partly broken away of one of these cells.
Figure 2:
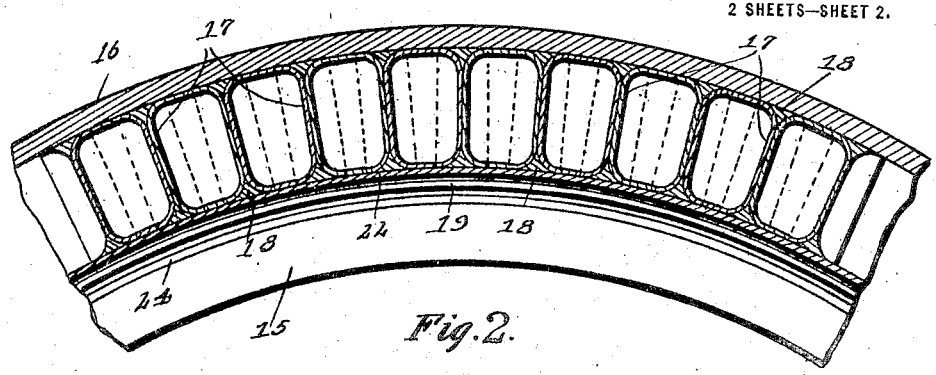
Fig. 2 is an enlarged longitudinal sectional view through the tire, including the adjacent portion of the wheel and felly.
Figure 3:
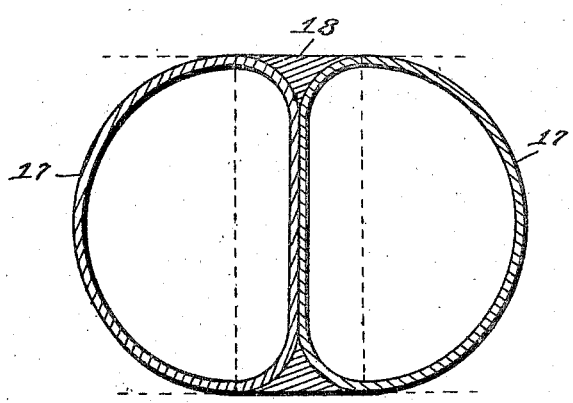
Fig. 3 is a diagram showing the action of the air cells as they are placed within the tire casing.

The tire, which is of the pneumatic type, includes the usual casing 16, which, may be either of the "straight side" type or clencher. Instead of employing the usual continuous inner tube, the invention contemplates the use of separate air cells, which are preferably inflated at the time of manufacture. These cells, as shown at 17, are of spherical form, their diameter being substantially the same as the inner diameter of the casing 16, so that when the said cells are crowded within the casing in the manner shown in Fig. 2 of the drawings, they will expand in a direction transversely of the tire and air pressure will be exerted circumferentially or around the tire tread. By making the cells in the shape shown and described, it is immaterial in what position they are placed within the casing, it being also immaterial should the cells turn within the casing in any direction whatever. When placed within the casing in the position shown in Fig. 2, the cells 17 will have their abutting portions substantially flat and parallel, leaving a space at the point of separation of these abutting portions. This space is filled by a separator 18, the cross sectional form of which is substantially triangular, so as to fit within this space. When filling the tire with the air cells, the said cells and separators are alternated and are crowded within the casing, until the latter has become sufficiently inflated, a predetermined number of air cells being used to obtain the proper degree of inflation. The seperators 18 are made of resilient material, preferably flexible rubber so that the resilient action of the tire is not impaired. This construction materially reduces the liability of puncture, as a sharp instrument entering the casing at the point of location of one of the separators will not penetrate the air cells. Should, however, one of the cells become punctured, the resiliency of the tire will not be perceptibly reduced, a few revolutions of the wheel causing adjacent separators to close over the air cells so that the casing support is again continuous. Should a blow-out occur at the point of puncture, the contact of the adjacent separators will form an inner reinforcement at the point of such blow-out.

The invention is susceptible of various changes in its form, proportions and minor details of construction and the right is herein reserved to make such changes as properly fall within the scope of the appended claim.

Having described the invention, what is claimed is:

In combination with a tire casing, of a plurality of permanently inflated independently removable spherical air cells adapted to be positioned in said casing in a circumferentially compressed condition and a plurality of flexible annular separators provided with inwardly beveled ends adapted to be positioned in said casing between each of said cells.

In testimony whereof I affix my signature.

HARRY OWEN.